United States Patent
Jindal

(10) Patent No.: US 9,548,800 B2
(45) Date of Patent: Jan. 17, 2017

(54) SPLIT CONTROL AND PAYLOAD VIA COOPERATIVE MASSIVE MIMO (M-MIMO) AND NON-M-MIMO INFRASTRUCTURE

(71) Applicant: Broadcom Corporation, Irvine, CA (US)

(72) Inventor: Nihar Jindal, Mountain View, CA (US)

(73) Assignee: Broadcom Corporation, Irvine, CA (US)

(*) Notice: Subject to any disclaimer, the term of this patent is extended or adjusted under 35 U.S.C. 154(b) by 91 days.

(21) Appl. No.: 14/186,868

(22) Filed: Feb. 21, 2014

(65) Prior Publication Data

US 2015/0244433 A1 Aug. 27, 2015

Related U.S. Application Data

(60) Provisional application No. 61/813,337, filed on Apr. 18, 2013.

(51) Int. Cl.
| | |
|---|---|
| *H04L 5/00* | (2006.01) |
| *H04B 7/04* | (2006.01) |
| *H04B 7/06* | (2006.01) |
| *H04W 76/00* | (2009.01) |
| *H04W 84/12* | (2009.01) |
| *H04W 88/06* | (2009.01) |
| *H04W 88/08* | (2009.01) |

(52) U.S. Cl.
CPC .......... *H04B 7/0413* (2013.01); *H04B 7/0689* (2013.01); *H04L 5/001* (2013.01); *H04L 5/0023* (2013.01); *H04L 5/0091* (2013.01); *H04L 5/0098* (2013.01); *H04W 76/00* (2013.01); *H04B 7/0691* (2013.01); *H04L 5/0048* (2013.01); *H04W 84/12* (2013.01); *H04W 88/06* (2013.01); *H04W 88/08* (2013.01)

(58) Field of Classification Search
CPC ...................................................... H04B 7/0413
See application file for complete search history.

(56) References Cited

U.S. PATENT DOCUMENTS

| | | | | |
|---|---|---|---|---|
| 2009/0196372 | A1* | 8/2009 | Zhang | H04B 7/0417 |
| | | | | 375/267 |
| 2011/0063989 | A1* | 3/2011 | Yang | H04B 7/0413 |
| | | | | 370/252 |
| 2011/0103324 | A1* | 5/2011 | Nam | H04W 72/042 |
| | | | | 370/329 |
| 2011/0243262 | A1* | 10/2011 | Ratasuk | H04L 27/261 |
| | | | | 375/260 |

(Continued)

*Primary Examiner* — Fan Ng
(74) *Attorney, Agent, or Firm* — Sterne, Kessler, Goldstein & Fox P.L.L.C.

(57) ABSTRACT

Embodiments provide systems and methods for enabling a wireless multi-access communication system having a first frequency band and a second frequency band. The first frequency band can be used to establish a first channel using a non-Massive Multiple Input Multiple Output (M-MIMO) radio access technology (RAT). The first channel can be used to broadcast downlink/uplink control information (and, optionally, data) between an access point (AP) and a user device. The second frequency band can be used to establish a second channel using a M-MIMO RAT. The second channel can be used to communicate high speed downlink/uplink data between an AP and a user device. The non-M-MIMO RAT and the M-MIMO RAT can be of the same RAT family or of different RAT families.

20 Claims, 6 Drawing Sheets

(56) References Cited

U.S. PATENT DOCUMENTS

| | | | | |
|---|---|---|---|---|
| 2012/0287870 A1* | 11/2012 | Lin | ............................ | G01N 3/24 |
| | | | | 370/329 |
| 2012/0294294 A1* | 11/2012 | Zhang | .................... | H04L 1/0025 |
| | | | | 370/338 |
| 2013/0100905 A1* | 4/2013 | Pan | ...................... | H04B 7/0417 |
| | | | | 370/329 |
| 2013/0195467 A1* | 8/2013 | Schmid | ................ | H04B 7/0413 |
| | | | | 398/115 |
| 2013/0208604 A1* | 8/2013 | Lee | ..................... | H04L 25/0226 |
| | | | | 370/252 |
| 2014/0116264 A1* | 5/2014 | Hauser | .................... | A21B 3/138 |
| | | | | 99/426 |

* cited by examiner

SPLIT CONTROL AND PAYLOAD VIA COOPERATIVE MASSIVE MIMO (M-MIMO) AND NON-M-MIMO INFRASTRUCTURE

TECHNICAL FIELD

The present disclosure relates generally to a split control and payload communication system using cooperative Massive Multiple Input Multiple Output (M-MIMO) and non-M-MIMO infrastructure.

BACKGROUND

Background Art

In a Massive Multiple Input Multiple Output (M-MIMO) communication system, a transmitter, such as a base station, is equipped with a very large number of transmit antennas (e.g., 32, 64, or 100) that can be used simultaneously for transmission to one or more receivers, such as a user equipment (UE).

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
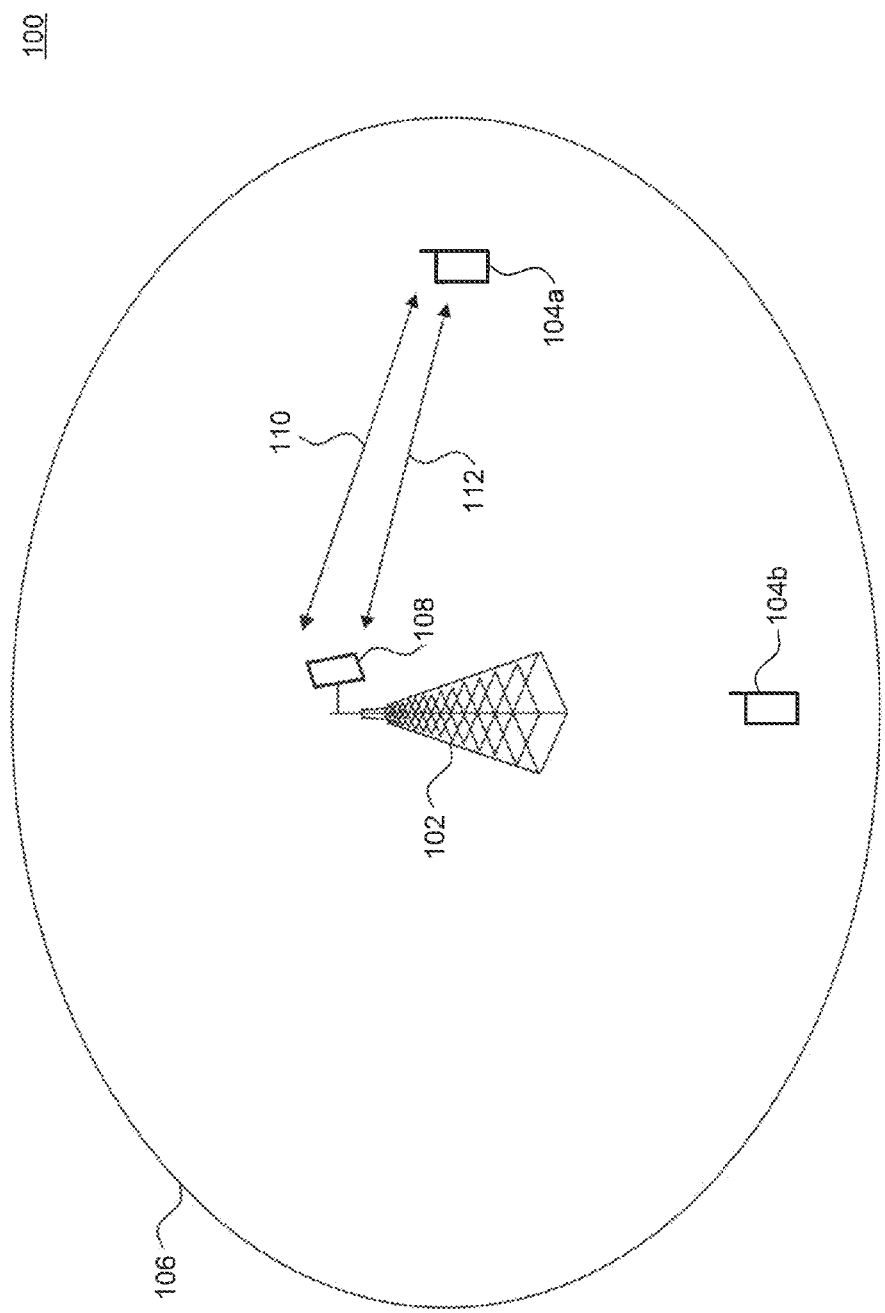
FIG. 1 illustrates an example environment in which embodiments can be implemented or practiced.

FIG. 1 illustrates an example environment 100 in which embodiments can be implemented or practiced. Example environment 100 is provided for the purpose of illustration only and is not limiting of embodiments. As shown in FIG. 1, example environment 100 includes an access point (AP) 102 and a plurality of user devices 104a and 104b located within a coverage area 106 of AP 102. AP 102 can be a cellular network base station, such as a Long Term Evolution (LTE) Evolved Node B (eNodeB), a Wireless Local Area Network (WLAN) AP, or an AP of any other known wireless radio access technology (RAT). Correspondingly, user devices 104a and 104b can be WLAN stations (STAs), cellular User Equipments (UEs), or wireless devices of any other known wireless RAT. In an embodiment, AP 102 and user devices 104a and 104b each supports multiple RATs.

In an embodiment, AP 102 includes a Massive Multiple Input Multiple Output (M-MIMO) antenna array 108 comprised of a plurality of antenna elements. M-MIMO antenna array 108 can be a uniform array (1D, 2D, or 3D), with uniform spacing between antenna elements, or a non-uniform array. The number of antenna elements of M-MIMO antenna array 108 is significantly larger than the number of antenna elements used in existing base station implementations (which can be up to 8 antenna elements). For example, M-MIMO antenna array 108 can have 16, 32, 64 or more antenna elements.

Using M-MIMO antenna array 108, AP 102 can deliver extremely high downlink/uplink data rates to user devices 104a and 104b by transmit/receive beamforming to/from user devices 104a and 104b. But in order to beamform, e.g., to user device 104a, AP 102 must first attach to user device 104a and then learn a downlink channel to user device 104a.

Generally, it is very difficult for AP 102 to establish a connection with a user device, e.g., user device 104a, using a M-MIMO RAT, i.e., a RAT that uses a M-MIMO antenna array to transmit/receive beamform to/from user devices. This is because M-MIMO transmissions are extremely directional and user specific, which makes it very challenging to broadcast information (e.g., control) and to blindly (without learning the downlink channel to the user devices) initiate communication with a user device using a M-MIMO RAT. In addition, even when a connection with a user device has been established, M-MIMO transmissions typically require considerable airtime overhead (e.g., for transmission of pilots that enable Channel estimation), which makes a M-MIMO RAT less practical for shorter (e.g., control) packets and more suited for longer (e.g., data) transmissions.

Embodiments, as further described below, provide, without limitation, systems and methods for enabling a wireless multi-access communication system having a first frequency band and a second frequency band. The first frequency band can be used to establish a first channel using a non-M-MIMO RAT (e.g., legacy LTE, legacy WLAN, etc.). The first channel can be used to broadcast downlink/uplink control information (and, optionally, data) between an AP and a user device. The second frequency band can be used to establish a second channel using a M-MIMO RAT. The second channel can be used to communicate high speed downlink/uplink data (using beamforming) between an AP and a user device. In an example embodiment, the first frequency band is at a lower frequency and has a lower bandwidth than the second frequency band. However, embodiments are not limited by this example. The non-M-MIMO RAT and the M-MIMO RAT can be of the same RAT family (e.g., legacy LTE and M-MIMO LTE) or of different RAT families (e.g., legacy LTE and M-MIMO AVIAN). Further, in some embodiments, the wireless multi-access communication system can support more than two frequency bands. For example, more than one of the "first" channel and/or more than one of the "second" channel can be implemented.

In an embodiment, the first channel is used to broadcast information from an AP to a user device, and vice versa. For example, the first channel can be used to establish a connection between an AP and a user device and to enable channel estimation to the user device. The first channel can also be used to signal control information regarding upcoming data frames on the first channel and/or the second channel.

In an embodiment, within a coverage area, the first channel and the second channel are controlled by the same AP. For example, referring to FIG. 1, AP 102 can implement a first channel 110 on a first frequency band using a non-M-MIMO RAT and a second channel 112 on a second frequency band using a M-MIMO RAT. AP 102 can implement the first channel 110 and the second channel 112 using its M-MIMO antenna array 108 only as further described below, or may include an additional non-M-MIMO antenna array (including, e.g., 2, 4, or 8 antenna elements) for implementing first channel 110. In another embodiment, as further described below, the first channel is controlled by a first AP and the second channel is controlled by a second AP.

Example embodiments are now presented. For the purpose of illustration only, the example embodiments are described with reference to example environment 100 discussed above and with reference to an example AP 200 illustrated in FIG. 2 described below. As would be understood by a person of skill in the art based on the teachings herein, embodiments are not limited by example environment 100 or example AP 200. Further, while the example embodiments described below focus on downlink transmission (and M-MIMO transmit beamforming) from AP 102 to a user device, e.g., user device 104a, this should not be used to limit embodiments as such. A person of skill in the art based on the teachings herein would understand that uplink transmission from a user device to AP 102 (and M-MIMO receive beamforming at AP 102) are also well within the scope of embodiments.

Figure 2:
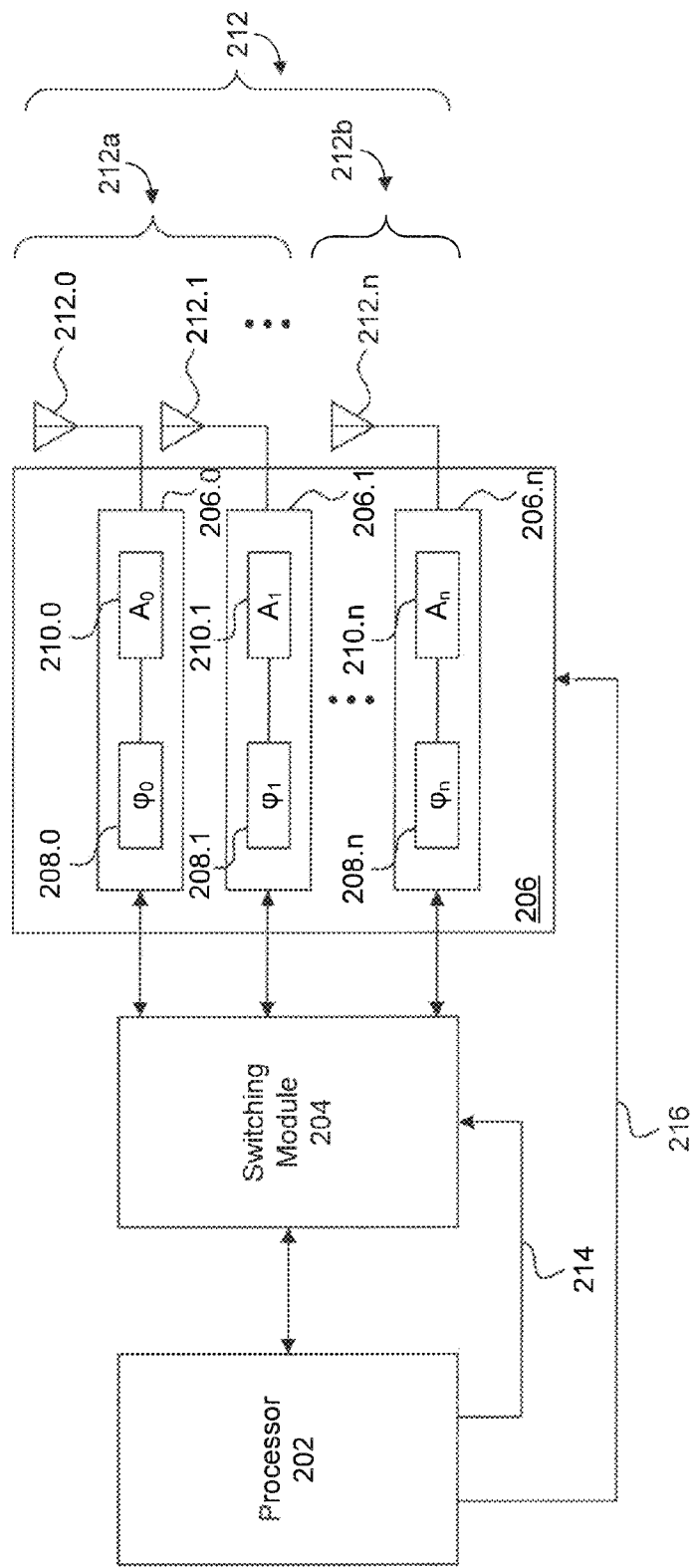
FIG. 2 illustrates an example base station according to an embodiment.

FIG. 2 illustrates an example AP 200 according to an embodiment. Example AP 200 is provided for the purpose of illustration only and is not limiting of embodiments. Example AP 200 may be an embodiment of AP 102 in example environment 100 discussed above. As shown in FIG. 2, example AP 200 includes, without limitation, a processor 202; a switching module 204; an antenna array controller 206, comprising a plurality of antenna controllers 206.0, 206.1, . . . , 206.n; a M-MIMO antenna array 212, comprising a plurality of antenna elements 212.0, 212.1, . . . , 212.n. In an embodiment, the plurality of antenna elements 212.0, 212.1, . . . , 212.n can be divided into a first subset 212a and a second subset 212b, which may or may not be overlapping. First subset 212a may include one or more antennas, sufficient to enable a non-M-MIMO RAT. Second subset 212b may include a plurality of antennas, sufficient to enable a M-MIMO RAT.

In an embodiment, processor 202 includes a baseband processor which generates one or more (e.g., N) symbol streams (not shown in FIG. 2) for transmission by AP 200 over the same time and frequency resources. The symbol streams each typically comprises a sequence of modulated symbols, which can include control information or user data. The symbol streams can be different from each other. Alternatively, some of the symbol streams can be duplicate. The symbol streams are generally intended for one or more user devices served by AP 200. For example, referring to FIG. 1, the one or more user devices may be one or more of user devices 104a and 104b. A user device served by AP 200 may be the intended recipient of one or more or none of the symbol streams transmitted by AP 200.

In an embodiment, before forwarding the symbol streams to M-MIMO antenna array 212 for transmission, processor 202 can pre-code the symbol streams by applying a transmit precoder matrix to the symbol streams. The transmit precoder matrix reduces to a transmit precoder vector in the case of a single data stream being transmitted; in the following the term transmit precoder matrix is used, but it would apparent to a person of skill in the art that embodiments also include the use of a transmit precoder vector. Typically, the transmit precoder matrix is selected based on partial or full knowledge of the downlink channel over which the data streams will be transmitted. When AP 200 has full channel knowledge to a user device, processor 202 can select the transmit precoder matrix such that any symbol streams intended for the user device are beamformed to the user device, thereby enabling a higher data rate to the user device. In Multi-User (MU) beamforming, AP 200 beamforms to multiple user devices using the same time and frequency resources. In such an embodiment, processor 202 selects the transmit precoder matrix such that each symbol stream is beamformed to its intended user device recipient but is received with reduced power or in a specific spatial dimension (e.g., aligned with other interfering signals) at another user device.

Typically, pre-coding is applied to symbol streams containing user data (and, optionally, to user specific control information) in order to enable directional transmission of data/control to intended user devices. While nothing according to embodiments precludes pre-coding symbol streams containing broadcast control information, typically such symbol streams, which are intended for all user devices, are not pre-coded. As used herein, pre-coding the symbol streams using the transmit precoder matrix generates data streams, which are understood to encompass user data (and optionally, user specific control information).

In an embodiment, if a multi-subcarrier system is used (e.g., Orthogonal Frequency Division Multiplexing), the pre-coding is performed on sub-carrier by sub-carrier basis. Depending on the actual values of the transmit precoder matrix, the data streams can each correspond to an amplitude and/or phase adjusted version of a single respective symbol stream (where the transmit precoder matrix is a diagonal matrix), or one or more of the data streams can be a weighted combination of two or more of the symbol streams. In the former case, an antenna element of M-MIMO antenna array 212 (which is used for transmission) would transmit a signal containing a single symbol stream only. In the latter case, the antenna element would transmit a signal containing a weighted combination of two or more symbol streams.

As mentioned above, in embodiments, processor 202 can select the transmit precoder matrix to ensure that symbol streams for a user device are beamformed to the user device. In other words, the transmit precoder matrix can be selected to produce a desired transmit beam pattern of M-MIMO antenna array 212. This functionality is enabled by the large number of transmitter degrees of freedom afforded by M-MIMO antenna array 212, which allows for the shaping of the transmit beam pattern as desired.

Similarly, in the receive direction, processor 202 can apply a receive decoding matrix to data streams received from M-MIMO antenna array 212. The receive decoding matrix reduces to a receive decoding vector in the case of a single data stream being received; in the following the term receive decoding matrix is used, but it would apparent to a person of skill in the art that embodiments also include the use of a receive decoding vector. The received decoding matrix can be selected to produce a desired receive beam pattern. In an embodiment, the receive decoding matrix can be selected to produce a receive beam pattern with a maximum spatial response in the direction of particular user device, or to produce a response such that the ratio of desired signal power to power from other (undesired) streams is maximized. This has the effect of improving the reception from the user device and can enable receive beamforming from the user device at AP 200. Like the transmit precoder matrix, the receive decoding matrix can be selected based on partial or full knowledge of the uplink channel over which the data streams are received. The uplink channel can be a MIMO channel, with multiple uplink channel paths from every transmit antenna to every receive antenna.

Switching module 204 is coupled to processor 202. In an embodiment, switching module 204 is controllable by processor 202 by means of a control signal 214 in order to couple the data streams from processor 202 to M-MIMO antenna array 212 or to couple signals received by M-MIMO antenna array 212 to processor 202. In an embodiment, processor 202 determines a subset (which may include all) of the plurality of antenna elements 212.0, 212.1, ..., 212.$n$ of M-MIMO antenna array 212 to transmit the data streams or to receive signals transmitted to AP 200. In an embodiment, processor 202 selects the subset of the plurality of antenna elements 212.0, 212.1, ..., 212.$n$ in accordance with the desired transmit beam pattern or in accordance with the desired receive beam pattern. For example, this may include selecting the subset of the plurality of antenna elements 212.0, 212.1, ..., 212.$n$ as having an appropriate geometry to produce the desired transmit beam pattern given any transmit precoder matrix being applied to the symbol streams or to produce the desired receive beam pattern given any receive decoding matrix being applied to the received data streams.

Antenna array controller 206 is coupled between switching module 204 and M-MIMO antenna array 212. In an embodiment, antenna array controller 206 includes a plurality of antenna controllers 206.0, 206.1, ..., 206.$n$ that correspond respectively to antenna elements 212.0, 212.1, ..., 212.$n$ of M-MIMO antenna array 212. In an embodiment, each antenna controller 206.0, 206.1, ..., 206.$n$ includes a respective phase controller 208 and a respective amplitude controller 210. Antenna array controller 206 can be implemented using digital and/or analog components.

In an embodiment, processor 202 controls antenna array controller 206 by means of a control signal 216. In another embodiment, processor 202 controls antenna array controller 206 using control signal 216 to activate one or more of antenna controllers 206.0, 206.1, ..., 206.$n$ depending on which of antenna elements 212.0, 212.1, ..., 212.$n$ is being used for transmission or reception. In an embodiment, when an antenna element 212.0, 212.1, ..., 212.$n$ is used for transmission or reception, its corresponding antenna controller 206.0, 206.1, ..., 206.$n$ is active. A phase shift can be applied to a signal being transmitted or received by an antenna element 212.0, 212.1, ..., 212.$n$ using its respective phase controller 208.0, 208.1, ..., 208.$n$. An amplitude amplification/attenuation can be applied to a signal being transmitted or received using an antenna element 212.0, 212.1, ..., 212.$n$ using its respective amplitude controller 210.0, 210.1, ..., 210.$n$. In an embodiment, the phase shift and amplitude amplification/attenuation are applied in the time domain to the signal.

In an embodiment, processor 202 determines, based on one or more of: the desired transmit beam pattern, the downlink channel, the selected transmit precoder matrix, and the subset of antenna elements used for transmission, a transmit weight vector for antenna array controller 206. In an embodiment, the transmit weight vector includes a complex element for each antenna controller 206.0, 206.1, ..., 206.$n$, which determines the respective phase shift and amplitude amplification/attenuation to be applied by the antenna controller to the signal being transmitted by its respective antenna element. In another embodiment, processor 202 determines, based on one or more of: the desired receive beam pattern, the uplink channel, the selected receive decoding matrix, and the subset of antenna elements used for reception, a receive weight vector for antenna array controller 206. In an embodiment, the receive weight vector includes a complex element for each antenna controller 206.0, 206.1, ..., 206.$n$, which determines the respective phase shift and amplitude amplification/attenuation to be applied by the antenna controller to the signal received by its respective antenna element. Hence, as described above, antenna array controller 206 provides an additional layer for shaping the transmit beam pattern or the receive beam pattern of M-MIMO antenna array 212.

According to embodiments, any combination of a transmit precoder matrix and a transmit weight vector (in addition to an appropriate selection of a subset of antenna elements) can be used to produce a desired transmit beam pattern of M-MIMO antenna array 212. Similarly, any combination of a receive decoding matrix and a receive weight vector (in addition to an appropriate selection of a subset of antenna elements) can be used to produce a desired receive beam pattern of M-MIMO antenna array 212. In the following, further embodiments will be described. For simplification, embodiments describe only the use of a transmit precoder matrix to produce a desired transmit beam pattern. However, it should be understood based on the teachings herein that embodiments encompass the use of any combination of transmit precoder matrix and transmit weight vector to produce desired transmit pattern (and similarly any combination of receive decoding matrix and receive weight vector to produce a desired receive beam pattern).

In an embodiment, in accordance with the embodiments described above, processor 202 is configured to generate one or more symbol streams containing broadcast control information, and to control switching module 2041 and antenna array controller 206 to couple the one or more symbol streams to first subset 212$a$ of M-MIMO antenna array 212. Processor 202 may also be configured to control other radio elements (not shown in FIG. 2) and first subset 212$a$ to broadcast a control signal, corresponding to the one or more symbol streams, on a first frequency band. In an embodiment, no pre-coding of the one or more symbol streams is performed before they are coupled to first subset 212$a$ of M-MIMO antenna array 212, and the broadcast of the control signal using first subset 212$a$ is performed using a non-M-MIMO RAT (e.g., legacy LTE, legacy WLAN, etc.).

In an embodiment, the control signal broadcast on the first frequency band includes a periodic beacon that identifies AP 200 to nearby devices, such as user devices within coverage of AP 200. For example, the periodic beacon can include a Service Set Identification (SSID) of AP 200. In an embodiment, in response to broadcasting the control signal, processor 202 receives an attachment request from a user device on the first frequency band. After establishing a connection with the user device, processor 202 signals the user device on the first frequency band to transmit a pilot signal on a second frequency band, possibly at a specified time and over a specific subset of the frequencies in the second frequency band.

In an embodiment, the second frequency band is at a higher frequency and includes more bandwidth than the first frequency band. For example, the first frequency band may be a 20 MHz band located at 2.4 or 5 GHz, and the second frequency band may be a 3 GHz band located at 60 GHz. However, embodiments are not limited by this example. In other embodiments, the bandwidth and location of the first frequency band and the second frequency band can be configured by the network, statically or dynamically, depending on system requirements, device capabilities, etc.

Subsequently, processor 202 receives the pilot signal transmitted on the second frequency band by the user device and generates an estimate of a downlink channel from AP 200 to the user device using the pilot signal. In an embodiment, processor 202 first generates an estimate of an uplink channel from the user device to AP 200 using the pilot signal, and then generates the estimate of the downlink channel based on the uplink channel estimate (e.g., using reciprocity). With full channel knowledge to the user device on the second frequency band, processor 202 can beamform data streams on the second frequency band to the user device.

In an embodiment, processor 202 is configured to generate one or more symbol streams intended for the user device; determine a transmit precoder matrix based at least in part of the estimate of the downlink channel; pre-code the one or more symbol streams using the transmit precoder matrix to generate the one or more data streams; and control second subset 212b of M-MIMO antenna array 212 to transmit the one or more data streams on the second frequency band. In an embodiment, processor 202 controls second subset 212b to transmit the one or more data streams using a M-MIMO RAT (e.g., M-MIMO LTE, M-MIMO WLAN, etc.).

In another embodiment, processor 202 controls second subset 212b to transmit the one or more data streams on the second frequency band simultaneously with the broadcast of the control signal on the first frequency band using first subset 212a as described earlier. As such, AP 200 enables a split control and payload communication system using cooperative M-MIMO and non-M-MIMO RATs and infrastructure. The communication system supports simultaneously a first (e.g., control) channel on the first frequency band using a non-M-MIMO RAT and a second (e.g., data/ user specific control) channel on the second frequency band using a M-MIMO RAT.

In an embodiment, while receiving the one or more data streams on the second frequency band, the user device can send acknowledgments on the first frequency band to AP 200. In one embodiment, after a pre-specified block of data (e.g., a pre-specified number of symbols) have been received by the user device, the user device transmits either a positive or a negative acknowledgement depending on its success/ failure at decoding that block of data. In another embodiment, the user device is free to transmit an acknowledgement (on the first frequency band) any time after it begins receiving data on the second frequency band. For example, if the instantaneous propagation channel quality is better than expected on the second frequency band, then the user device may be able to successfully decode the data at an earlier time than expected, and may accordingly immediately signal this information back to AP 200 so that the AP 200 can proceed to a subsequent transmission. In another embodiment, the user device can send instantaneous Signal-to-Interference-and-Noise (SINR) measurements on the first frequency band while receiving the one or more data streams. Using this real time SINR feedback, AP 200 can fine tune the transmit precoder matrix to improve beamforming to the user device, or could adaptively adjust the modulation and coding scheme (MCS).

In another embodiment, the user device, if equipped with a M-MIMO antenna array and a M-MIMO RAT, can also use the second frequency band to beamform transmissions to AP 200. In an embodiment, user devices attached to AP 200 use a reservation procedure to reserve an uplink channel of the second frequency band. In an embodiment, the reservation procedure includes a user device broadcasting a Request to Send (RTS) packet on the first frequency band to reserve the uplink channel and AP 200 responding with a Clear to Send (CTS) packet on the first frequency band to grant the uplink channel to the user device.

Figure 3:
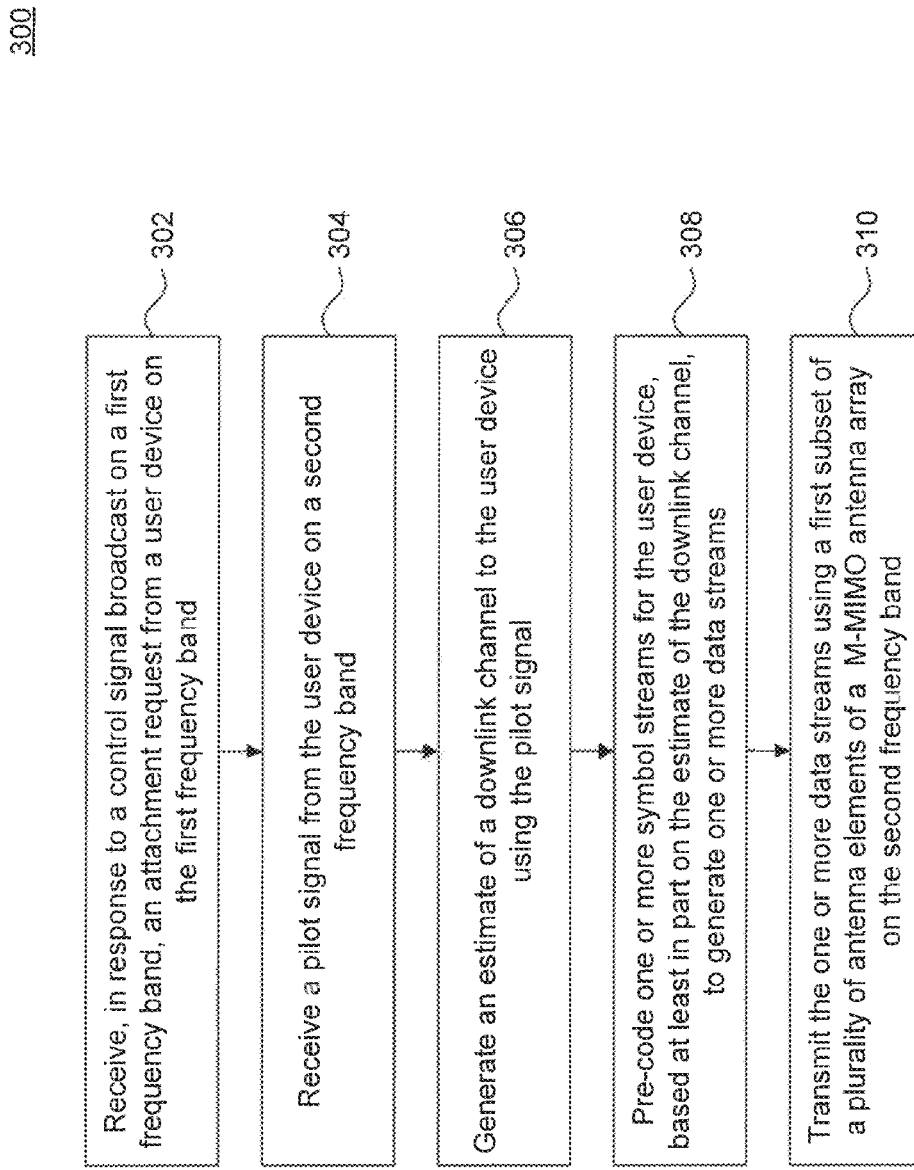
FIGS. 3 and 4 illustrate example processes according to an embodiment.

FIG. 3 is an example process 300 according to an embodiment. Example process 300 is provided for the purpose of illustration only and is not limiting of embodiments. Example process 300 can be performed by an AP having a M-MIMO antenna array, such as AP 200. AP 200 can be, without limitation, a WLAN AP or an LTE base station, for example.

As Shown in FIG. 3, process 300 begins in step 302, which includes receiving, in response to a control signal broadcast on a first frequency band, an attachment request from a user device on the first frequency band. In an embodiment, the control signal is broadcast on the first frequency band using a subset of antenna elements of the M-MIMO antenna array using a non-M-MIMO RAT. For example, 1, 2, 4, or 8 antenna elements of the M-MIMO antenna array can be used to broadcast the control signal. In an embodiment, the control signal includes a SSID of the AP.

Subsequently, step 304 includes receiving a pilot signal from the user device on a second frequency band. In an embodiment, step 304 is in response to an instruction by the AP to the user device to transmit the pilot signal on the second frequency band after successful attachment with the AP. In an embodiment, the instruction to the user device is preceded by a check by the AP that the user device can support communication on the second frequency band. In an embodiment, the second frequency band is at a higher frequency and includes more bandwidth than the first frequency band. Then, in step 306, process 300 includes generating an estimate of a downlink channel to the user device using the pilot signal. The downlink channel corresponds to a downlink channel on the second frequency band.

Next, in step 308, process 300 includes pre-coding one or more symbol streams for the user device, based at least in part on the estimate of the downlink channel, to generate one or more data streams. In an embodiment, the one or more symbol can include user data and/or user specific control information intended for the user device. In an embodiment, the pre-coding of the one or more symbol streams includes determining a transmit precoder matrix based at least in part on the estimate of the downlink channel to the user device, and pre-coding the one or more symbol streams using the transmit precoder matrix to generate the one or more data streams.

Process 300 terminates in step 310, which includes transmitting the one or more data streams using a first subset of the plurality of antenna elements of the M-MIMO antenna array on the second frequency band. In an embodiment, transmitting the one or more data streams includes beamforming the one or more data streams on the second frequency band to the user device using a M-MIMO RAT. In an embodiment, the first subset of the M-MIMO antenna array is larger than the subset of the M-MIMO antenna array used to broadcast the control signal. For example, the first subset may be the entire plurality of antenna elements of the M-MIMO antenna array.

In an embodiment, the AP can use the second frequency band to transmit a data channel composed of a sequence of OFDM frames. Each OFDM frame includes a determined number of OFDM symbols, where each OFDM symbol corresponds to a plurality of sub-carriers (e.g., which span the second frequency band) for a specific time slot. In other words, each OFDM frames includes a plurality of time/frequency physical resource blocks. Within each OFDM frame, the AP can load data streams for one or more user devices. For example, the AP can use the physical resource blocks corresponding to a first sub-carrier to transmit data streams intended for a first user device, and the physical resource blocks corresponding to a second sub-carrier to transmit data streams intended for a second user device. Additionally, as described above, using its M-MIMO antenna array, the AP can transmit multiple data streams over the same physical resource blocks to multiple user devices. The AP can further ensure that the multiple data streams are beamformed to their respective user device recipients.

In an embodiment, to support this M-MIMO enabled data channel on the second frequency band, the AP uses the first frequency band to broadcast a control channel that describes upcoming downlink OFDM data frames on the second frequency band. In an embodiment, the control channel is synchronized with the data channel such that the control channel can be read by a user device to identify downlink data transmissions intended for the user device just prior to their transmission by the AP. For example, the control channel may provide a pre-amble for each OFDM frame of the data channel, but on a different frequency band. Information carried by the control channel can identify the specific time/frequency resources of an OFDM frame (time slots and frequency sub-carriers) carrying data for the user device, the modulation and coding scheme (MCS) used by the AP for the data transmission, and any other parameters needed by the user device to correctly decode the data transmission. In another embodiment, the AP can further use the control channel to relay information regarding uplink time/frequency resources to be used by the user devices in their uplink data transmissions. The uplink data transmissions can then take place on the second frequency band, for example.

In another embodiment, the AP uses the first frequency band to broadcast a downlink data channel in addition to the control channel described above. For example, the first frequency band can be divided in time and/or frequency to support both the data channel and the control channel. In an embodiment, the first frequency band is divided in time between the data channel and the control channel. In another embodiment, the data channel of the first frequency band is time synchronized with the data channel implemented on the second frequency band, and the control channel provided on the first frequency band is used to describe upcoming downlink OFDM frames on both the first frequency band and the second frequency band. As such, the AP can provide two parallel data channels, one on the first frequency band using a non-M-MIMO RAT, and one of the second frequency band using a M-MIMO RAT. A user device can announce its device capabilities to the AP to receive transmissions on the first frequency band, the second frequency band, or both.

Figure 4:
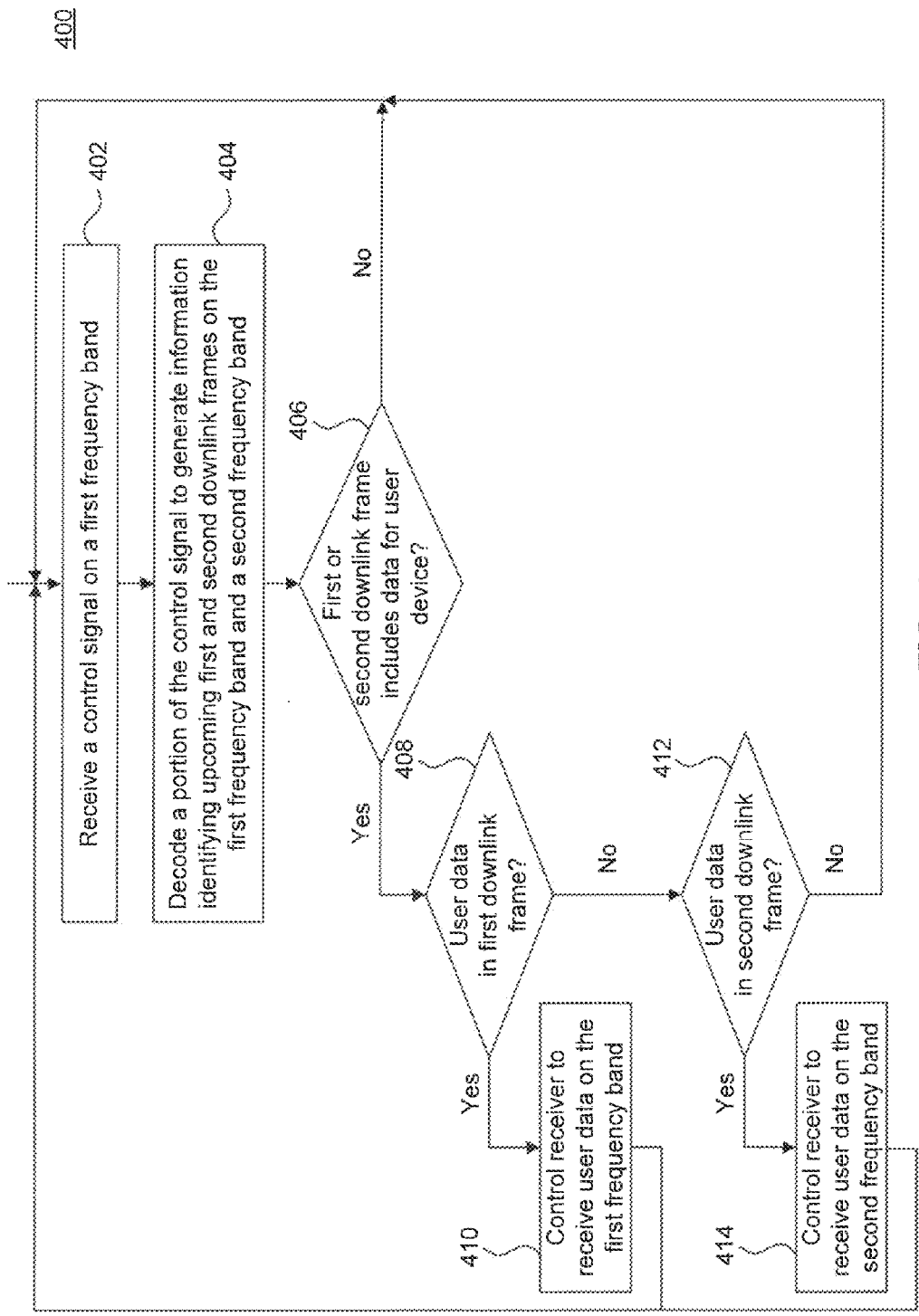

FIG. 4 is an example process 400 according to an embodiment. Example process 400 is provided for the purpose of illustration only and is not limiting. Example process 400 can be performed by a user device, such as user device 104*a*, for example.

As shown in FIG. 4, process 400 begins in step 402, which includes receiving a control signal on a first frequency band. In an embodiment, the control signal is broadcast by an AP using a non-M-MIMO RAT and can be received by any user device within coverage of the AP. In an embodiment, the control signal is part of a control channel that describes upcoming downlink OFDM data frames on the first frequency band and on a second frequency band dedicated for M-MIMO communication.

Subsequently, in step 404, process 400 includes decoding a portion of the control signal to generate information identifying upcoming first and second downlink frames on the first frequency band and the second frequency band respectively. In an embodiment, the generated information includes map information for each of the first and second downlink frames. The map information identifies the intended recipient(s) for each physical resource block of the frame, the MCS scheme of the physical resource block, and any other parameters needed by the user device to correctly decode the bits loaded into the physical resource block.

Then, process 400 proceeds to step 406, which includes determining whether the first or the second downlink frame includes data intended for the user device. If neither of the first and second downlink frames include data for the user device, process 400 returns to step 402 to monitor the control channel for subsequent downlink frames on the first frequency band and the second frequency band. Otherwise, process 400 proceeds to step 408.

Step 408 includes determining if the first downlink frame includes data intended for the user device. If the answer is yes, process 400 proceeds to step 410, which includes controlling a receiver of the user device to receive user data on the first frequency band. In an embodiment, the first frequency band is a 20 MHz band located at 2.4 or 5 GHz. However, embodiments are not limited by this example. In an embodiment, step 410 includes tuning the receiver to the first frequency band and demodulating a received signal at specific time/frequency physical resource blocks corresponding to the user data as provided by the map information of the first downlink frame. After receiving the user data in step 410, process 400 returns to step 402.

If the answer is no in step 408, process 400 proceeds to step 412, which includes determining if the second downlink frame includes data intended for the user device. If the answer is yes, process 400 proceeds to step 414, which includes controlling the receiver of the user device to receive user data on the second frequency band. In an embodiment, the second frequency band is a 3 GHz band located at 60 GHz. However, embodiments are not limited by this example. In an embodiment, step 414 includes tuning the receiver to the second frequency band and demodulating a received signal at specific time/frequency physical resource blocks corresponding to the user data as provided by the map information of the second downlink frame. After receiving the user data in step 414, process 400 returns to step 402. Otherwise, if the answer is no in step 412, process 400 returns to step 402.

In another embodiment, the user device can have the ability to receive simultaneously on both the first frequency band and the second frequency band. As such, the AP may transmit data for the user device on both frequency bands simultaneously, and the user device may control its receiver in accordance with the generated map information to receive the data on both frequency bands simultaneously.

In a similar fashion, an uplink control channel can be set up on the first frequency band. The uplink control channel can be logically defined in time and/or frequency within the first frequency channel. In an embodiment, user devices use a random access algorithm (e.g., carrier sense multiple access (CSMA)) to access the uplink control channel. In another embodiment, more than one user device can access the uplink control channel simultaneously by precoding their uplink transmissions on the channel such that they are received in an orthogonal fashion (e.g., different spatial dimensions) at the AP. In one embodiment, a user device specifies on the uplink control channel upcoming uplink data transmissions on the first frequency band and/or the second frequency band. For example, the user device can indicate the time and frequency resources of the upcoming uplink data transmissions. In an embodiment, the user devices use a resource selection algorithm that ensures that user devices select orthogonal resources on the first frequency and/or the second frequency band. In another embodiment, user devices can listen to the uplink control channel and can avoid using the same resources as other devices. In a further embodiment, user devices precode their uplink data transmissions such that they are received in an orthogonal fashion at the AP, and as such can transmit simultaneously on the same physical resources in the uplink. Alternatively, user devices can use the same time/frequency physical resources in the uplink without pre-coding their respective uplink transmissions. The AP, having a very large number of receive degrees of freedom, can utilize advanced decoding algorithms to separate the various user device transmissions. As would be understood by a person of skill in the art, each of these embodiments can be used to free the AP from the task of scheduling uplink data transmissions.

Figure 5:
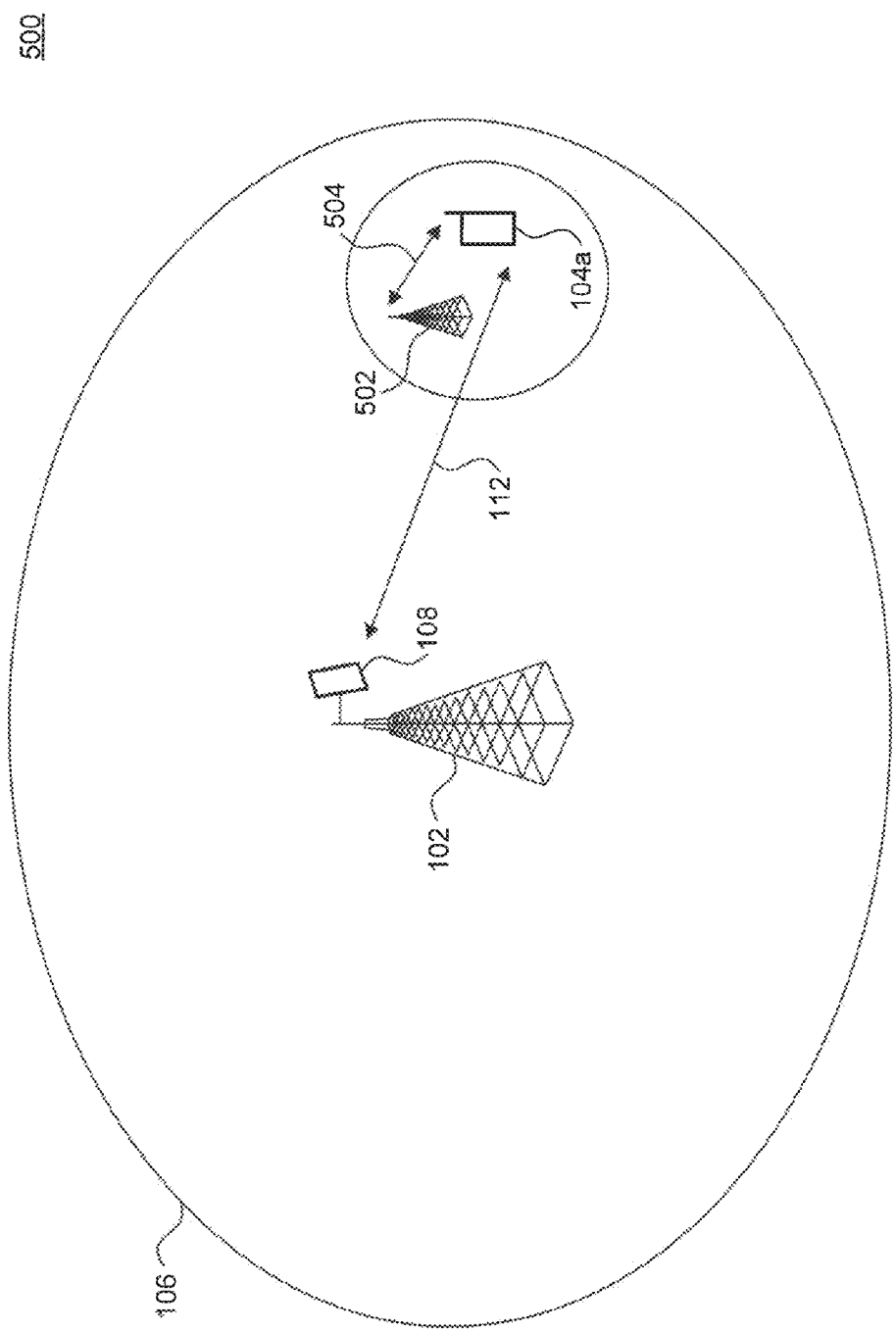
FIG. 5 illustrates another example environment in which embodiments can be implemented or practiced.

FIG. 5 illustrates another example environment 500 in which embodiments can be implemented or practiced. Example environment 500 is provided for the purpose of illustration only and is not limiting of embodiments. Like example environment 100 described above, example environment 500 includes an AP 102 having a M-MIMO antenna array 108 and user device 104a within a coverage area 106 of AP 102. In addition, example environment 500 includes a second AP 502 located within coverage area 106 of AP 102. In an embodiment, AP 102 is a macrocell AP and AP 502 is a femtocell AP. In another embodiment, AP 102 and AP 502 can both be macrocell APs with overlapping coverage areas. In an embodiment, user device 104a is located within a coverage area of AP 502 as shown in FIG. 5. As such, user device 104a can be served by one or more of AP 102 and AP 502.

In an embodiment, APs 502 and 102 implement a first RAT and a second RAT respectively. The first and second RATs may or may not be of the same RAT family. For example, the first RAT and the second RAT can both be LTE or WLAN. Alternatively, the first RAT can be WLAN and the second RAT can be LTE, or vice versa. In another embodiment, the first and second RATs are of the same RAT family, but one can be a M-MIMO RAT and the other can be a legacy non-M-MIMO RAT.

In an embodiment, AP 502 is configured to broadcast a control signal on a first frequency band. In an embodiment, the control signal is part of a first channel 504 implemented by AP 502 on the first frequency band. AP 502 can use a non-M-MIMO RAT to broadcast the first channel. In an embodiment, the control signal broadcast on the first frequency band by AP 502 includes a periodic beacon that identifies AP 502 to nearby devices. For example, the periodic beacon can include a SSID of AP 502. In an embodiment, in response to broadcasting the control signal, AP 502 receives an attachment request from user device 104a on the first frequency band. After establishing a connection with user device 104a, AP 502 signals user device 104a on the first frequency band to transmit a pilot signal on a second frequency band.

User device 104a transmits the pilot signal on the second frequency band. In an embodiment, AP 102 is configured to receive the pilot signal from user device 104a on the second frequency band, and to generate an estimate of a downlink channel from AP 102 to user device 104a using the pilot signal. With full channel knowledge to user device 104a, AP 102 can now beamform one or more data streams to user device 104a on a second channel 112 implemented by AP 102.

In an embodiment, second channel 112 is implemented by AP 102 using a M-MIMO RAT. Accordingly, in an embodiment, AP 102 can be configured to determine a transmit precoder matrix, based at least in part on the estimate of the downlink channel to user device 104a; pre-code one or more symbol streams intended for user device 104a using the transmit precoder matrix to generate one or more data streams; and transmit the one or more data streams using M-MIMO antenna array 108 on the second frequency band.

Thus, as described above, example environment 500 describes a split control and payload communication system using multiple M-MIMO and non-M-MIMO APs. As would be understood by a person of skill in the art based on the teachings herein, all of the embodiments described above with respect to example environment 100 can be equally applied in example environment 500. For example, first channel 504 can be structured similarly to and configured to carry similar information as first channel 110 described above.

In addition, in another embodiment, AP 102 can be configured to implement first channel 504 and AP 502 (further equipped with a M-MIMO antenna array) can be configured to implement second channel 112. For example, in an embodiment, AP 102 can provide a broadcast control (and optionally data) channel over coverage area 106, and one or more APs, such as AP 502, provide one or more second (data) channel(s) 112 over their respective coverage areas using M-MIMO RATs. In another embodiment, the broadcast channel provided by AP 102 can be a multi-RAT control channel that supports multiple data channels of various RATs provided by other APs (e.g., AP 502) located within coverage area 106. A user device within coverage area 106 can read the broadcast channel to identify upcoming downlink data intended for the user device from one or more APs, such as AP 502. The upcoming downlink data can be transmitted to the user device using same or different RATs. In a further embodiment, the broadcast channel can include a sleep schedule for the user device with respect to each RAT supported by the user device.

Figure 6:
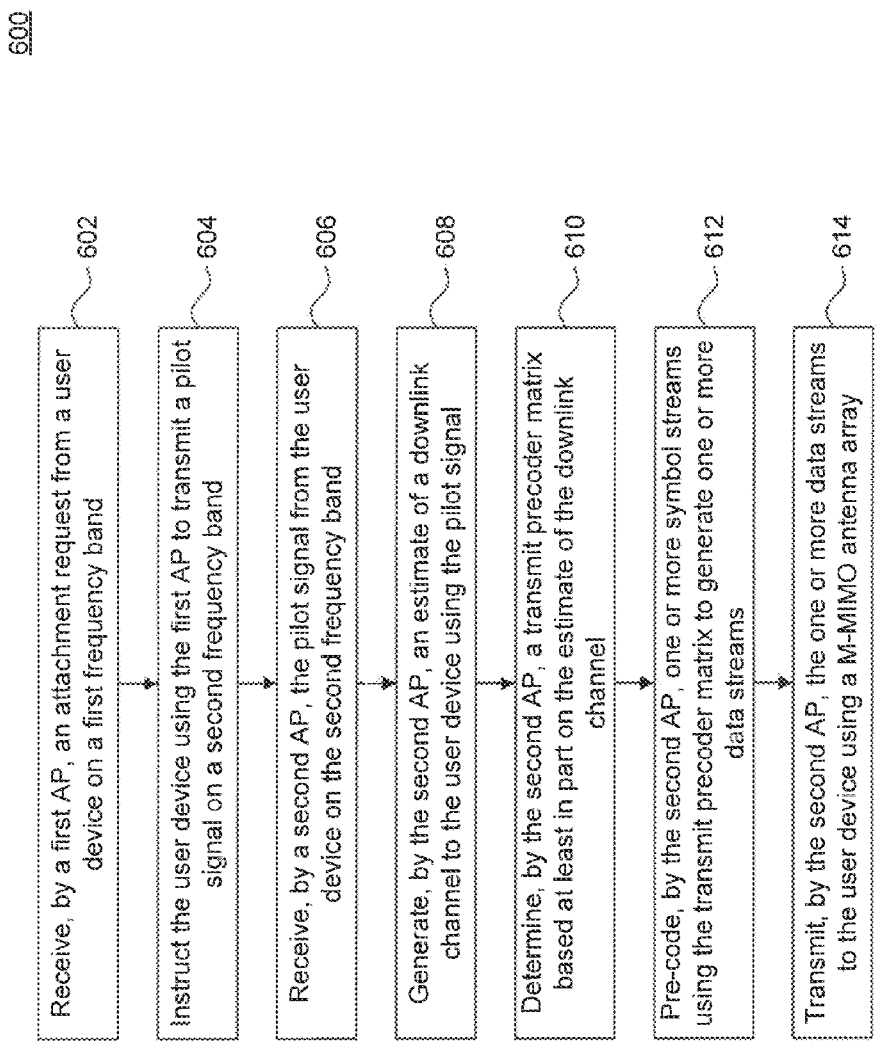
FIG. 6 illustrates an example process according to an embodiment.

FIG. 6 illustrates an example process 600 according to an embodiment. Example process 600 is provided for the purpose of illustration only and is not limiting of embodiments. Example process 600 can be performed by a first AP and a second AP, such as AP 102 and AP 502 respectively, or vice versa, in an environment such as example environment 500.

As shown in FIG. 6, process 600 begins in step 602, which includes receiving, by the first AP, an attachment request from a user device on a first frequency band. In an embodiment, the attachment request is in response to a control signal broadcast by the first AP on the first frequency band.

Process 600 then proceeds to step 604, which includes instructing the user device, using the first AP, to transmit a pilot signal on a second frequency band. In an embodiment, the second frequency band is at a higher frequency than the first frequency band. Subsequently, step 606 includes receiving, by the second AP, the pilot signal from the user on the second frequency band. Then, in step 608, process 600 includes generating, by the second AP, an estimate of a downlink channel from the second AP to the user device using the pilot signal.

Next, step 610 includes determining, by the second AP, a transmit precoder matrix based at least in part on the estimate of the downlink channel to the user device. In an embodiment, the transmit precoder matrix is determined in order to beamform one or more symbol streams to the user device. The transmit precoder matrix may also be determined in order to transmit other symbols streams intended for other user devices simultaneously with the transmission of the one or more symbol streams to the user device.

Process 600 then proceeds to step 612, which includes pre-coding, by the second AP, the one or more symbol streams using the transmit precoder matrix to generate one or more data streams; and then terminates in step 614, which includes transmitting, by the second AP, the one or more data streams to the user device using a M-MIMO antenna array.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and Modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. An Access Point (AP), comprising:
   a Massive Multiple Input Multiple Output (M-MIMO) antenna array comprising a plurality of antenna elements; and
   a processor configured to control a first subset of the plurality of antenna elements of the M-MIMO antenna array to broadcast a control signal on a first frequency band using a non-M-MIMO radio access technology (RAT), and further configured to control a second subset of the plurality of antenna elements of the M-MIMO antenna array to beamform one or more data streams on a second frequency band to a user device using a M-MIMO RAT,
   wherein the processor is further configured to: generate one or more symbol streams intended for the user device; determine a transmit precoder matrix; and pre-code the one or more symbol streams using the transmit precoder matrix to generate the one or more data streams,
   wherein the control signal broadcast on the first frequency band using the non-M-MIMO RAT includes control information for the one or more data streams beamformed on the second frequency band to the user device using the M-MIMO RAT.

2. The AP of claim 1, wherein the processor is further configured in response to broadcasting the control signal to:
   receive an attachment request from the user device on the first frequency band;
   instruct the user device to transmit a pilot signal on the second frequency band;
   receive the pilot signal from the user device on the second frequency band; and
   generate an estimate of a downlink channel to the user device using the pilot signal.

3. The AP of claim 2, wherein the processor is further configured to determine the transmit precoder matrix, based at least in part on the estimate of the downlink channel.

4. The AP of claim 1, wherein the processor is further configured to control the first subset and the second subset of the plurality of antenna elements of the M-MIMO antenna array to simultaneously broadcast the control signal on the first frequency band and beamform the one or more data streams on the second frequency band to the user device.

5. The AP of claim 1, wherein the one or more data streams correspond to one or more physical resource blocks of an Orthogonal Frequency Division Multiplexing (OFDM) frame, and wherein the processor is further configured to adapt the control signal to include information identifying the one or more physical resource blocks prior to transmission of the OFDM frame.

6. The AP of claim 5, wherein the information identifying the one or more physical resource blocks prior to transmission of the OFDM frame identifies time slots and frequency sub-carriers of the one or more physical resource blocks.

7. The AP of claim 5, wherein the information identifying the one or more physical resource blocks prior to transmission of the OFDM frame identifies a modulation and coding scheme (MCS) used for the one or more physical resource blocks.

8. The AP of claim 1, wherein the first frequency band is at a lower frequency and has a lower bandwidth than the second frequency band.

9. The AP of claim 1, wherein a location of the first frequency band and a location of the second frequency band are configured dynamically.

10. A method performed by an Access Point (AP) having a Massive Multiple Input Multiple Output (M-MIMO) antenna array comprising a plurality of antenna elements, the method comprising:
    receiving, in response to a control signal broadcast on a first frequency band, an attachment request from a user device on the first frequency band;
    receiving a pilot signal from the user device on a second frequency band;
    generating an estimate of a downlink channel to the user device using the pilot signal;
    generating one or more symbol streams;

determining a transmit precoder matrix based at least in part on the estimate of the downlink channel;

pre-coding the one or more symbol streams for the user device using the transmit precoder matrix to generate one or more data streams;

transmitting the one or more data streams, using a M-MIMO radio access technology (RAT) and a first subset of the plurality of antenna elements of the M-MIMO antenna array on the second frequency band to the user device; and transmitting the control signal, using a non-M-MIMO RAT and a second subset of the plurality of antenna elements of the M-MIMO antenna array, on the first frequency band, wherein the control signal transmitted on the first frequency band using the non-M-MIMO RAT includes control information for the one or more data streams transmitted on the second frequency band using the M-MIMO RAT.

11. The method of claim 10, wherein the transmitting the one or more data streams comprises beamforming the one or more data streams on the second frequency band to the user device.

12. The method of claim 10, wherein the first frequency band is at a lower frequency and has a lower bandwidth than the second frequency band.

13. A system, comprising:

a first Access Point (AP) configured to broadcast a control signal on a first frequency band using a non-Massive Multiple Input Multiple Output (M-MIMO) radio access technology (RAT); and a second AP, having a M-MIMO antenna array, configured to beamform one or more data streams on a second frequency band to a user device using a M-MIMO RAT, wherein the control signal broadcast on the first frequency band using the non-M-MIMO RAT includes control information for the one or more data streams beamformed on the second frequency band to the user device using the M-MIMO RAT, wherein the first AP is further configured to receive an attachment request from the user device on the first frequency band and instruct the user device to transmit a pilot signal on the second frequency band.

14. The system of claim 13, wherein the second AP is further configured to:

receive the pilot signal from the user device on the second frequency band;

generate an estimate of a downlink channel to the user device using the pilot signal;

determine a transmit precoder matrix, based at least in part on the estimate of the downlink channel; and pre-code one or more symbol streams using the transmit precoder matrix to generate the one or more data streams.

15. The system of claim 13, wherein the first AP is a femto cell base station, and the second AP is a macro cell base station.

16. The system of claim 13, wherein the first access point is configured to broadcast the control signal on the first frequency band at the same time that the second access point beamforms the one or more data streams on the second frequency band to the user device.

17. The system of claim 13, wherein the one or more data streams correspond to one or more physical resource blocks of an Orthogonal Frequency Division Multiplexing (OFDM) frame, and wherein the first access point is further configured to adapt the control signal to include information identifying the one or more physical resource blocks prior to transmission of the OFDM frame.

18. The system of claim 17, wherein the information identifying the one or more physical resource blocks prior to transmission of the OFDM frame identifies time slots and frequency sub-carriers of the one or more physical resource blocks.

19. The system of claim 17, wherein the information identifying the one or more physical resource blocks prior to transmission of the OFDM frame identifies a modulation and coding scheme (MCS) used for the one or more physical resource blocks.

20. The system of claim 13, wherein the first frequency band is at a lower frequency and has a lower bandwidth than the second frequency band.

* * * * *